(12) United States Patent
Zhang

(10) Patent No.: US 6,404,809 B1
(45) Date of Patent: Jun. 11, 2002

(54) METHOD AND APPARATUS FOR TRAINING EQUALIZER STRUCTURES IN A DIGITAL COMMUNICATION SYSTEM HAVING PERIODIC DIGITAL IMPAIRMENTS

(75) Inventor: Xuming Zhang, Mission Viejo, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/149,638

(22) Filed: Sep. 8, 1998

(51) Int. Cl.[7] .......................... H03H 7/30; H03K 5/159; H04B 3/20
(52) U.S. Cl. ...................... 375/232; 370/286; 370/291; 379/406.08
(58) Field of Search ................................ 375/232, 231, 375/230, 233, 229; 333/18, 28 R; 708/322, 323; 370/286, 290, 291, 292, 523; 379/410, 411, 406.01, 406.06, 406.08

(56) References Cited

U.S. PATENT DOCUMENTS 5,790,658 A * 8/1998 Yip et al. .................... 379/406
5,825,823 A   10/1998 Goldstein et al. ........... 375/286
6,002,713 A * 12/1999 Goldstein et al. ........... 375/222
6,108,354 A *  8/2000 Scull et al. .................. 370/523

* cited by examiner

*Primary Examiner*—Betsy L. Deppe
(74) *Attorney, Agent, or Firm*—Farjami & Farjami LLP

(57) ABSTRACT

An improved two-point equalizer training technique for use with V.90 modem systems utilizes a number of scaling parameters to enable the compensation of robbed bit signaling (RBS) effects in a manner that is decoupled from the compensation of analog impairments in the data communication channel. The preferred technique employs six scaling parameters corresponding to the six RBS phases typically associated with practical V.90 systems. One of the scaling parameters is fixed at a value of one to simplify the computational load associated with the adaptive training algorithms. The decision error is utilized to adaptively adjust the equalizer filter taps and the scaling parameters. The techniques of the present invention may be used to initially train the equalizer resident at the analog client modem and/or to initially train the echo canceler resident at the digital server modem.

18 Claims, 7 Drawing Sheets

METHOD AND APPARATUS FOR TRAINING EQUALIZER STRUCTURES IN A DIGITAL COMMUNICATION SYSTEM HAVING PERIODIC DIGITAL IMPAIRMENTS

FIELD OF THE INVENTION

The present invention relates to adaptive equalizer training procedures for use with digital data communication systems. More particularly, the present invention relates to an efficient adaptive equalizer training procedure that decouples the compensation of digital impairments, such as robbed bit signaling, from the compensation of analog impairments.

BACKGROUND OF THE INVENTION

Digital communication systems may employ a number of initialization, training, and adaptive learning protocols that are designed to equalize the channel distortions, optimize the data transmission speed, reduce transmission errors, and improve the quality of the received signal. For example, the current generation of pulse code modulation (PCM) modems, i.e., modem systems compliant with ITU-T Recommendation V.90, perform an initial training procedure to adaptively adjust the equalizer structure resident at the client-side analog modem (APCM). In addition, an echo canceler architecture resident at the server-side digital modem (DPCM) may be adaptively trained during an initialization period such that the echo channel associated with the DPCM is adequately emulated.

V.90 modem systems perform an initial two-point training procedure during which one constellation signal point (based on a particular $\mu$-law or A-law level) is transmitted as a sequence having positive and negative signs. The DPCM transmits the two-point training sequence to the APCM, and the APCM analyzes the received signal to determine the channel characteristics and to adjust its equalizers. FIG. 1 illustrates a typical V.90 modem downstream transmission channel 100 over which such a training sequence may be sent. The signal b(n) may represent a sequence of digital symbols, e.g., 8-bit codewords, that are to be transmitted by a DPCM transmitter 102, where "n" represents the time index for the transmitted symbol.

A number of digital impairments 104, such as robbed bit signaling (RBS) and digital pads, may be present within the digital network channel associated with the DPCM. A digital to analog conversion occurs at a codec 106 to facilitate transmission to the end user over an analog loop. Analog impairments 108, such as nonlinear and linear distortion, may be associated with the analog loop and/or any number of analog processing components. Furthermore, in practical applications, additive noise 110 may be introduced to the analog signal before the analog signal is received by the APCM receiver 112.

In practical V.90 systems, RBS-altered symbols are usually periodic in nature based on the symbol count, e.g., RBS may occur every six or twelve symbols. Furthermore, the effect of RBS is deterministic but unknown to the APCM, while digital pads cause a constant, deterministic, and level-dependent (nonlinear) effect. Prior art modem systems may compensate for linear analog impairments, such as amplitude and phase distortions, with well known linear equalization techniques. However, such techniques may not adequately compensate for the presence of digital impairments, which may alter the level associated with the predetermined training point. Consequently, the initial training procedure performed by conventional V.90 modem systems may not provide the most efficient and effective result.

Digital impairments may also cause similar problems during the training of the DPCM echo canceler, which may be configured as an adaptive equalizer structure. The presence and effects of downstream (and upstream) digital impairments are not known by the DPCM and conventional echo canceler training techniques may not adequately compensate for digital impairments located within the DPCM echo channel. Thus, such conventional echo canceler training procedures may not provide an optimum and efficient solution.

SUMMARY OF THE INVENTION

Accordingly, an advantage of the present invention is that it provides an improved technique for training an equalizer structure of a digital data communication system in response to a two-point training signal.

Another advantage of the present invention is that it provides an equalizer training technique that compensates for the presence of digital impairments such as RBS.

A further advantage is that the two-point training procedure decouples the compensation of digital impairments from the compensation of analog impairments.

Another advantage of the two-point training procedure is that it may be utilized during the training of echo canceler structures.

The above and other advantages of the present invention may be carried out in one form by a method of training an equalizer structure in a data communication system having a communication channel susceptible to deterministic, periodic digital impairments and analog impairments. Such a method may include the steps of: transmitting, over the communication channel, a sequence of digital codewords having positive and negative signs, where each of the digital codewords represents the same magnitude; obtaining an impaired digital sequence generated in response to the sequence of digital codewords, where the impaired digital sequence may be affected by the digital and analog impairments; compensating for the effect of the digital impairment on the impaired digital sequence, where the compensating step is decoupled from the compensation of the analog impairments; and adjusting an adaptive equalizer element in response to the compensating step, the adaptive equalizer element being employed to equalize the impaired digital sequence.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EMBODIMENTS OF THE INVENTION

The present invention may be described herein in terms of functional block components and various processing steps. It should be appreciated that such functional blocks may be realized by any number of hardware components configured to perform the specified functions.

For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, training, signal processing and conditioning, and the like. Such general techniques that may be known to those skilled in the art are not described in detail herein.

Figure 1:
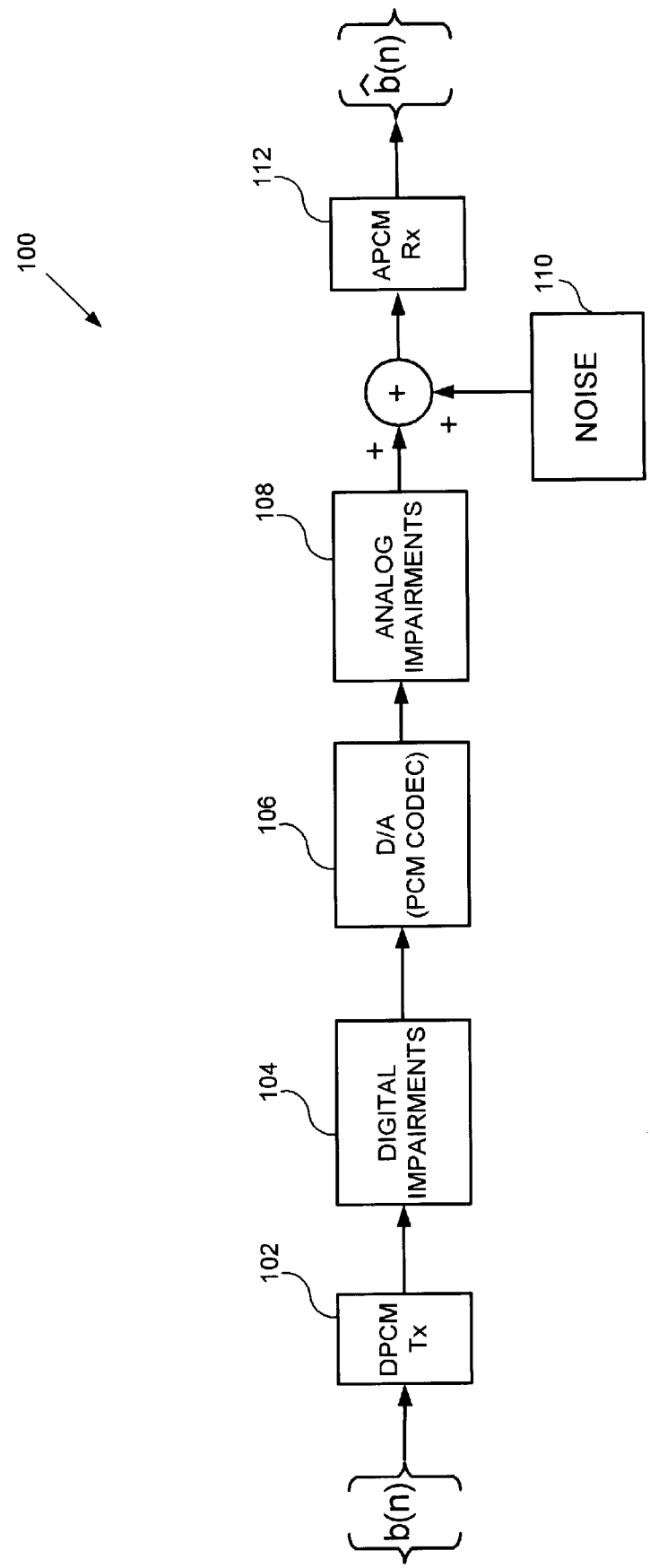
FIG. 1 is a schematic representation of an exemplary downstream transmission channel associated with a V.90 modem system.

As discussed above in the connection with FIG. 1, analog and digital impairments affect the characteristics of signals transmitted by a V.90 modem system. As shown in FIG. 1, the affected analog signal is eventually obtained by the APCM receiver 112. During the initial training interval, a predetermined two-point training sequence is transmitted by DPCM transmitter 102 and received and processed by APCM receiver 112 such that APCM receiver 112 can adaptively train its equalizers.

In the context of this description, the two-point training signal originates at the DPCM as a sequence of a single digital codeword having randomly (or pseudo-randomly) generated positive and negative signs. Thus, only one magnitude or level is associated with the two-point training sequence. The particular digital codeword employed by the data communication system may be predetermined such that it is known by both communicating devices. For example, Recommendation V.90 sets forth a universal set of 8-bit PCM codewords (both $\mu$-law and A-law) that are used by V.90 modem systems. The particular codeword utilized in the two-point training sequence may be adaptively determined by the modem system prior to commencing the two-point training procedure. The specific details of the conventional V.90 two-point training and the PCM codewords are contained in the ITU-T Recommendation V.90, the entire contents of which are incorporated herein by reference.

Figure 2:
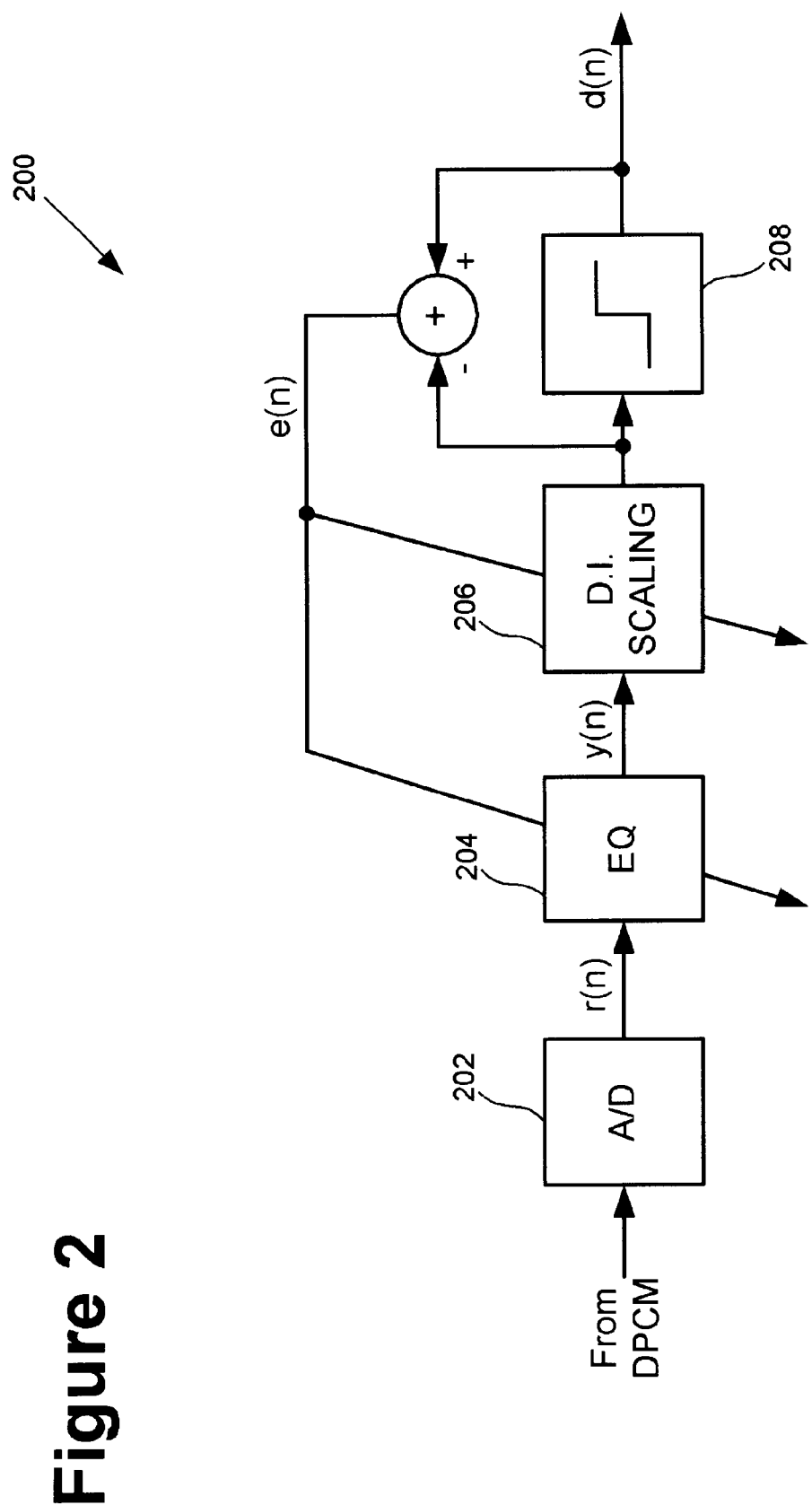
FIG. 2 is a schematic representation of a portion of an APCM receiver configured to perform the equalizer training techniques of the present invention.
Figure 3:
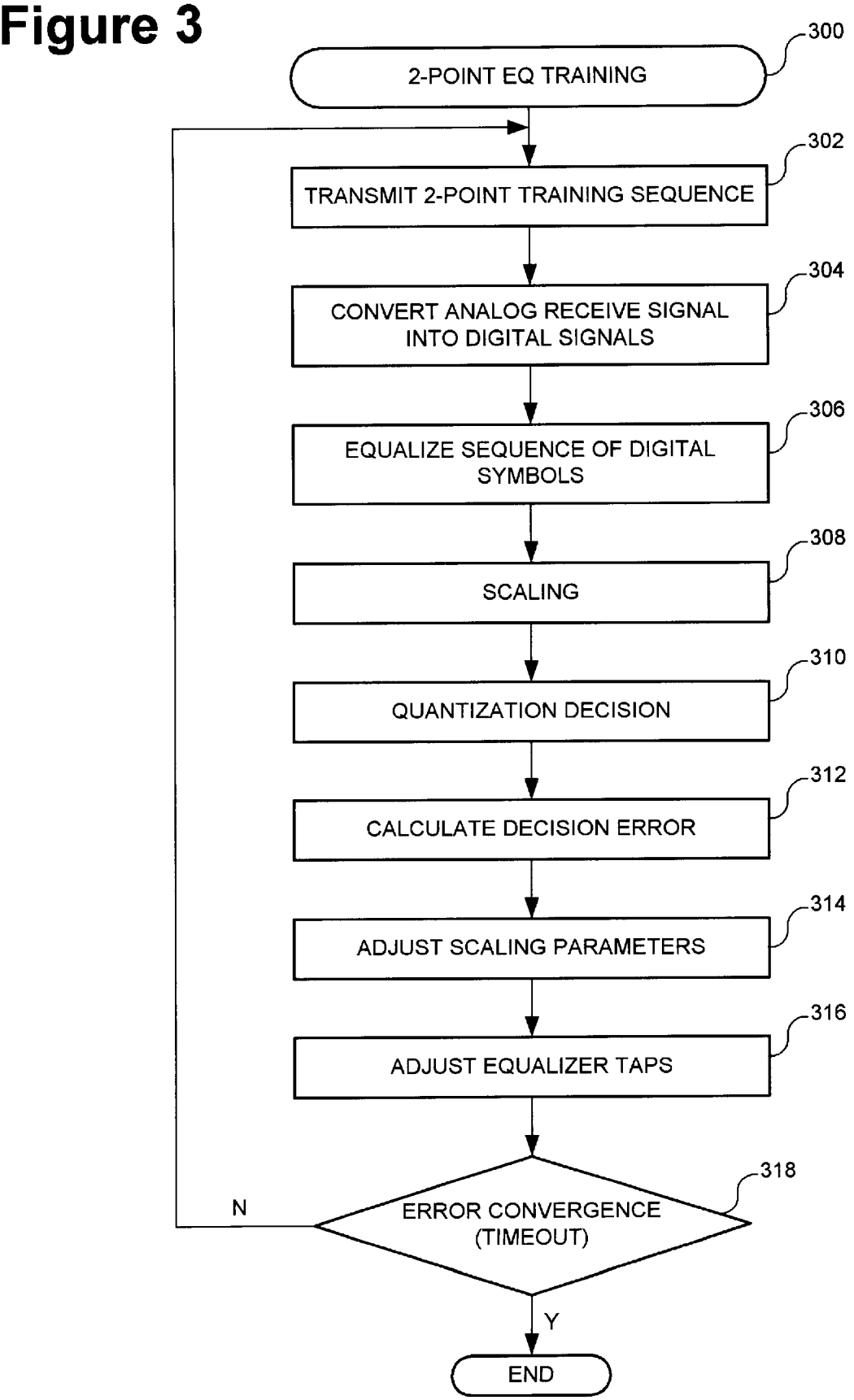
FIG. 3 is a flow diagram of an exemplary two-point training process that may be performed by a data communication system implementing the techniques of the present invention.

FIG. 2 is a general block diagram depiction of a portion of an exemplary APCM receiver 200 that is configured in accordance with the principles of the present invention, and FIG. 3 is a flow diagram of a two-point equalizer training process 300 that may be performed by the modem system to train the equalizers resident at APCM receiver 200. Process 300 may begin with a task 302, which causes the DPCM to transmit the two-point training sequence of digital symbols. While being transmitted, digital impairments such as RBS and digital pads may affect the training sequence, and the training sequence is eventually converted to an analog signal for transmission over the local loop (the digital to analog conversion may be performed by, e.g., codec 106 shown in FIG. 1).

Due to the nature of the transmission channel (see FIG. 1), the APCM receives an analog representation of the two-point training signal (which is a sequence of digital symbols) transmitted by the DPCM. APCM receiver 200 may include or be associated with a linear analog to digital converter (ADC) 202, which is configured to reverse the digital to analog conversion and mapping of codec 106. ADC 202 may be associated with a PCM codec or any suitable operating element of the data communication system. Accordingly, during a task 304, ADC 202 (or any suitable analog-to-digital converter) preferably converts the received analog signal into an equivalent sequence of 8-bit digital symbols r(n). This received sequence may be considered to be an impaired sequence of digital symbols, i.e., the converted sequence of digital symbols will likely be affected by RBS and/or digital pads. This sequence of digital symbols may then be equalized by a suitable equalizer structure 204 to produce an equalized output y(n).

Equalizer 204 is preferably configured to compensate for transmission channel characteristics such as analog impairments. Equalizer 204 may be an adaptive equalizer structure having adjustable parameters, e.g, filter taps, that control the operation of equalizer 204. In a practical embodiment, equalizer 204 may be realized by any number of filter components. For example, equalizer 204 may include a feedforward equalizer (FFE), a decision feedback equalizer (DFE), a noise predictor (NPD), or the like, or any suitable combination of such components. Such components may be fractionally spaced or T-spaced, depending on the specific application. These, and other equalizer and filter arrangements known to those skilled in the art, may be employed in the context of the present invention. A number of such prior art elements are described in detail in ADAPTIVE FILTER THEORY (3rd ed. 1996) by Simon Haykin, the entire contents of which are incorporated herein by reference.

Referring again to FIG. 3, a task 306 causes equalizer structure 304 to suitably equalize the impaired sequence to obtain a corresponding sequence of equalized digital symbols y(n). Following the equalization task, process 300 proceeds to compensate for the presence of digital impairments (e.g., RBS) in a manner that is decoupled from the compensation of analog impairments. This decoupled compensation preferably begins with a task 308, which scales the sequence of equalized digital symbols with an adaptive digital impairment scaling element 206 resident at APCM receiver 200.

In practical V.90 modem systems, RBS occurring in the digital portion of the transmission channel periodically affects the least significant bit of transmitted symbols. In most cases, RBS forces the least significant bit of the affected symbol to zero. Thus, an RBS-affected codeword may be received as if it were one level less than the transmitted level. To account for the effect of RBS, scaling element 206 is preferably configured to adjust the equalized digital sequence in a manner that compensates for the presence of RBS. Scaling element 206 compensates for RBS by adjusting the magnitude of the current digital symbol by an appropriate amount. Scaling element 206 may be configured to compensate for RBS that occurs before a digital pad and/or for RBS that occurs after a digital pad. Briefly, scaling element 206 follows a preferred scaling protocol that may be particularly suited to the practical structure of APCM receiver 200. In the preferred embodiments, scaling element 206 multiplies the magnitude associated with the current digital symbol by a scaling factor that corresponds to the current symbol timing index n.

As described briefly above, RBS is a periodic phenomena in practical systems, i.e., if the symbol at time index $n=n_0$ is affected, then the symbol at time index $n=n_{0+N}$ will also be affected. Thus, RBS affects a transmitted sequence of digital symbols in a periodic manner based on a period of N symbols. In current V.90 modem systems that operate in conjunction with practical telecommunication networks, RBS is based on a period of six symbols (or an integer multiple of six symbols). RBS is a deterministic (but unknown to the receiver) digital impairment in that once its presence and period are known, the effect it has on any transmitted symbol can be determined. To this end, scaling element 206 preferably includes six individual scaling parameters that contemplate each of the possible RBS symbol positions, relative to a six-symbol segment. In accordance with a preferred aspect of the present invention, one of the six scaling parameters is restricted to a value of one (or any other suitable value) and the remaining five scaling parameters are thereafter adaptively adjusted. It should be appreciated that the use of a fixed reference value ensures the unique convergence of the scaling factors and provides an efficient way to perform the adaptive algorithm computations associated with the present training procedures.

With continued reference to FIG. 3, a task 310 preferably causes APCM receiver 200 to perform a quantization decision for each of the scaled digital symbols. In the exemplary embodiment, task 310 is performed by a slicer 208 (see FIG. 2). Slicer 208 generates an output codeword that best approximates the current input symbol. In an ideal optimized system, the input and the output to slicer 208 is substantially equal and, consequently, the decision error e(n) would be zero. However, due to the practical nature of the data communication system, some amount of decision error will be present (e.g., error caused by additive noise or imperfections in the equalization process). The decision error is utilized to adaptively adjust equalizer 204 and/or scaling element 206 in an attempt to optimize the performance of APCM receiver 200. In a practical embodiment, once the decision error converges to an acceptable value, equalizer 204 is considered to be adequately trained.

In accordance with the illustrated embodiment, a task 312 calculates a quantization decision error e(n) for each of the scaled digital symbols by subtracting the input to slicer 208 from the output of slicer 208. Task 312 may be performed by a summer, a subtractor, or any other suitable processing component. Alternate embodiments may subtract the output from the input or calculate the decision error in an alternate manner. The particular derivation of the decision error may require a modification to the adaptive algorithms utilized to update the scaling parameters and/or the characteristics of equalizer structure 204. Following task 312, a task 314 may be performed to adaptively adjust the operational characteristics of the scaling protocol. In the preferred embodiment, task 314 adaptively adjusts the value of the current scaling parameter in response to the decision error. In addition to task 314, a task 316 may be performed to adaptively adjust operational characteristics of equalizer structure 204. For example, task 316 may cause the equalizer filter taps to be adjusted in response to the decision error.

Process 300 may continuously repeat itself for each symbol timing index until the initial training period has elapsed. For example, a query task 318 may test whether the current decision error for each RBS symbol phase has converged to a predetermined value. Alternatively, query task 318 may determine whether an iteration counter or other timeout mechanism has been triggered. If so, then process 300 may end or exit to enable the modem system to continue with any number of other initialization procedures. For example, once the scaling parameters are determined and equalizer structure 204 is initially trained, scaling element 206 may be disabled to allow APCM receiver 200 to modify the decision slicer reference levels for the various RBS phases. Thereafter, the modem system may proceed to estimate the specific digital impairment mapping levels by performing a digital impairment learning procedure.

Figure 4:
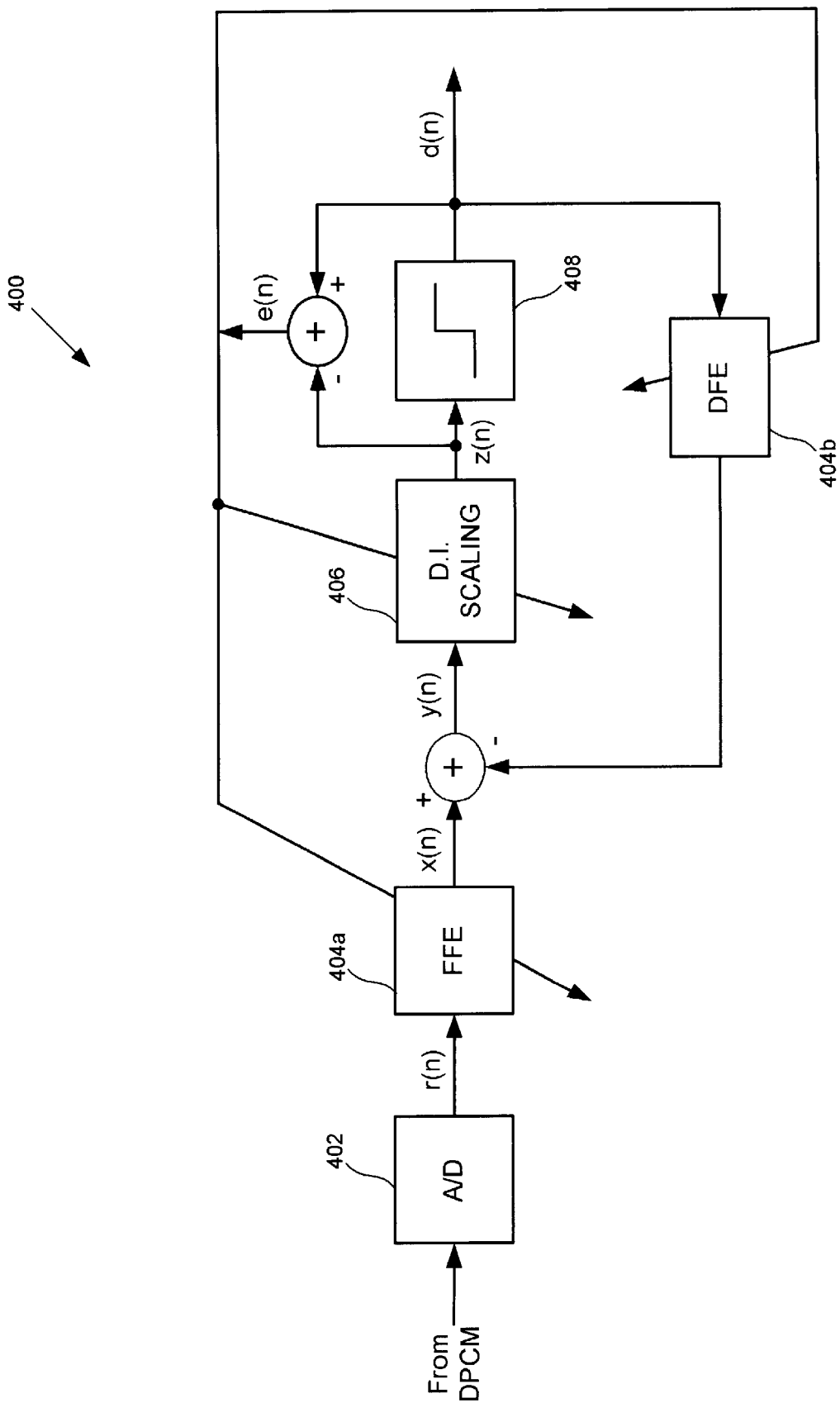
FIG. 4 is a schematic representation of a portion of an APCM receiver configured in accordance with one embodiment of the present invention.

FIG. 4 is a schematic representation of a portion of an APCM receiver 400 in accordance with a preferred embodiment of the present invention. In FIG. 4, ADC 402, scaling element 406, and slicer 408 are generally similar in form and function to their respective counterpart components described above in connection with FIG. 2. However, the general equalizer 204 in FIG. 2 is replaced with an alternative equalizer structure 404 in FIG. 4. Equalizer structure 404 preferably includes an FFE element 404a in conjunction with a DFE element 404b. Such pre-cursive and post-cursive equalization techniques are known to those skilled in the art. In this embodiment, x(n) refers to the digital sequence output from FFE element 404a, while y(n) refers to the overall output of equalizer structure 404.

As described above, the preferred embodiment assumes that one of the scaling parameters has a fixed reference value of one. Although the present invention is not limited to any particular reference value, one is a convenient value because in the absence of RBS, all of the scaling parameters would be one (in an ideal noiseless and distortionless system). For illustrative purposes, the following description identifies the scaling parameters as $\alpha(0)$, $\alpha(1)$, $\alpha(2)$, $\alpha(3)$, $\alpha(4)$, and $\alpha(5)$. Furthermore, the following description assumes that $\alpha(0)=1$ is the fixed reference parameter.

For the exemplary arrangement shown in FIG. 4, scaling element 406 applies one of the six scaling parameters in accordance with the current symbol timing index. Accordingly, scaling element 406 may be responsive to a modulo-6 counter (not shown); such counters are commonly employed in practical V.90 modem systems. The preferred adaptive algorithm associated with the updating of the remaining five scaling parameters is:

$$\alpha_k(n \text{ MOD } 6) = \alpha_{k-1}(n \text{ MOD } 6) - \mu_\alpha e(n) y(n).$$

In this relationship, k refers to the current updating iteration, $\mu_\alpha$ represents the step size associated with the scaling factor adaptation, e(n) represents the quantization decision error for the n-th symbol, and y(n) represents the n-th equalized digital symbol (i.e., the input to scaling element 406). The MODULO operator keeps the periodic count associated with the RBS, relative to the current symbol timing index. The step size is selected to enable the above algorithm to cause e(n) to converge to acceptable values in an efficient length of time.

The adaptive algorithms associated with the adjustment of FFE 404a and DFE 404b may include contributions from the scaling parameters. For example, if the filter taps of FFE 404a are defined as f(i) for i=0, 1, 2, ..., L−1, and the filter taps of DFE 404b are defined as b(i) for i=1, 2, ..., M, then the final decision variable can be written as:

$$z(n) = \left[\sum_{i=0}^{L-1} f(i)r(n-i) - \sum_{i=1}^{M} b(i)d(n-i)\right]\alpha(n \text{ MOD } 6),$$

and the final decision error can be calculated as: $e(n)=z(n)-d(n)$.

It follows that the FFE and DFE taps can be updated according to the following algorithms:

$f_k(i)=f_{k-1}(i)-\mu_f r(n-i)e(n)\alpha_{k-1}(n \text{ MOD } 6)$, for $i=0$ to $L-1$;

$b_k(i)=b_{k-1}(i)+\mu_b d(n-i)e(n)\alpha_{k-1}(n \text{ MOD } 6)$, for $i=1$ to $M$;

where $\mu_f$ and $\mu_b$ are the step sizes for the adaptation of FFE 404a and DFE 404b, respectively. As described above, $\alpha(0)$ is assumed to have a fixed value of one, without any loss. It should be appreciated that other constraints on the scaling parameters are possible, such as the unit energy constraint, i.e., $$\sum_{i=0}^{5} \alpha^2(i) = 1.$$

The purpose of such a constraint is to ensure that the scaling solution is unique because otherwise there may be an arbitrary gain distribution between the scaling parameters and the FFE and DFE filter taps.

If the unit energy constraint for the scaling factors is used, then the adaptation algorithms can be modified accordingly as follows (a represents the modified scaling factors):

$a_k(n \text{ MOD } 6)=a_{k-1}(n \text{ MOD } 6)-\mu_\alpha e(n)y(n)$;

$$\alpha_k(i) = \frac{a_k(i)}{\sqrt{\sum_{i=0}^{5} a_k^2(i)}}.$$

After the equalizer is adequately trained, the scaling parameters may be disabled and the slicing references for the six RBS phases may be modified as follows:

$Q(i)=Q_{ref}/\alpha(i)$, for $i=0$ to $5$, where $Q_{ref}$ is the pre-defined magnitude of the binary transmit signal. Therefore, the decision rule becomes:

$d(n)=Q(i)$, if $z(n) \leq 0$, for all ($n$ MOD 6)$=i$;

$d(n)=-Q(i)$, if $z(n)<0$, for all ($n$ MOD 6)$=i$;

and $Q(i)$ becomes the modified slicer level for RBS phase $i$.

Figure 5:
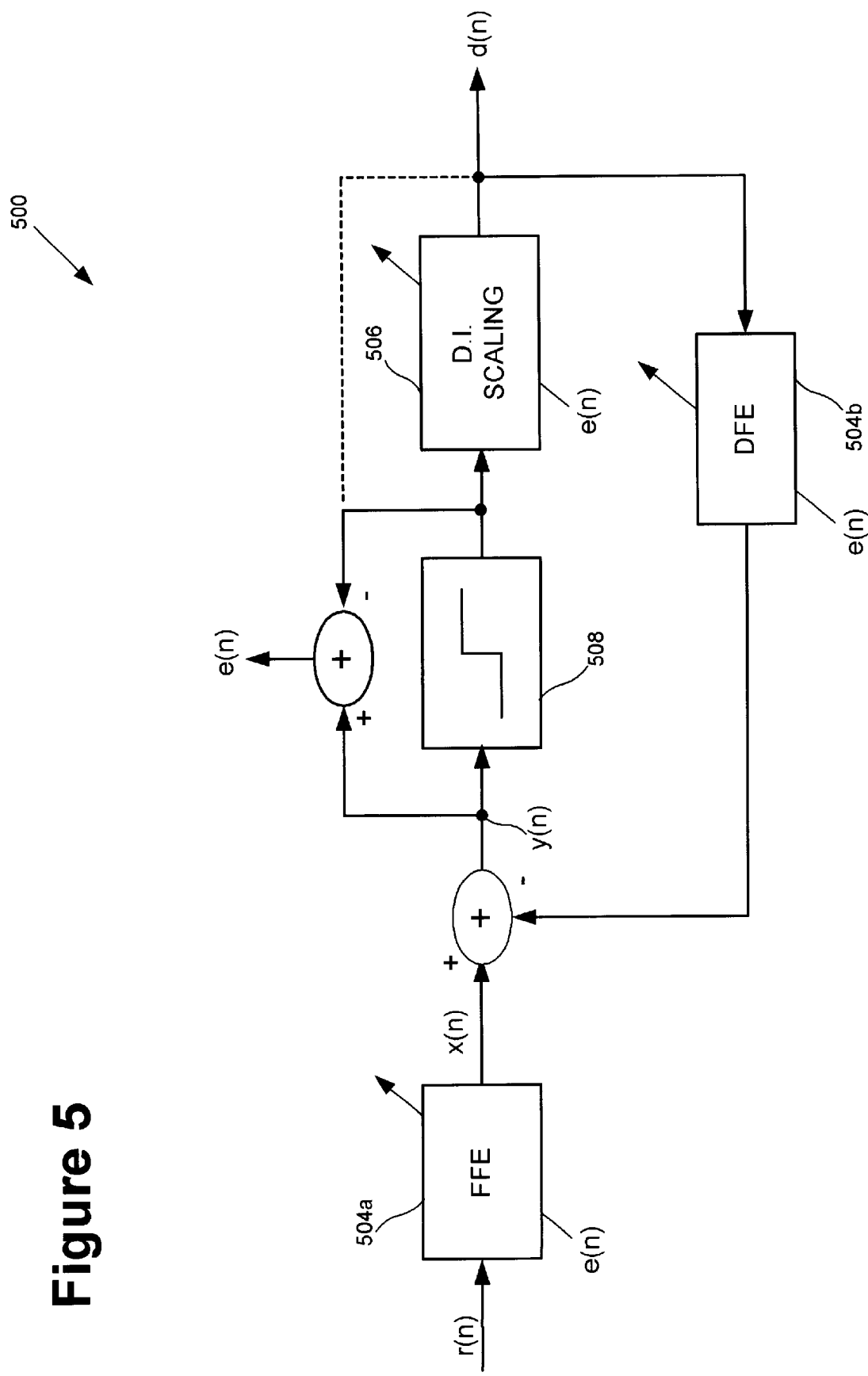
FIG. 5 is a schematic representation of a portion of an APCM receiver configured in accordance with an alternate embodiment of the present invention.

FIG. 5 depicts a schematic representation of another preferred embodiment of the present invention. A portion of this alternate APCM receiver 500 includes the following elements that are similar to those described above in connection with FIG. 4: FFE 504a, DFE 504b, scaling element 506, and slicer 508. In this embodiment, scaling element 506 is located after slicer 508. This arrangement is preferred because the digital symbols output from scaling element 506 will approximate the actual data transmitted by the DPCM codec. Although the adaptive algorithms for this embodiment are more complex than those described above in connection with the embodiment of FIG. 4, all of the scaling parameters can be updated for each decision error rather than one at a time as in the previous embodiment.

The final decision variable for APCM receiver 500 can be expressed in the following manner:

$$y(n) = \sum_{i=0}^{L-1} f(i)r(n-i) - \sum_{i=1}^{M} b(i)d(n-i)\alpha((n-i) \text{ MOD } 6),$$

and the decision error can be expressed as $e(n)=y(n)-d(n)$. Alternatively, the scaling parameters can be included in the expression for the final decision error: $e'(n)=y(n)-d(n)\alpha(n \text{ MOD } 6)$. This alternative arrangement is represented by the dashed line in FIG. 5, where the output of scaling element 506 is utilized to generate the decision error rather than the input of scaling element 506.

If the first decision error expression is used to update the equalizer taps and the scaling parameters, then the adaptive algorithms can be expressed as follows:

$f_k(i)=f_{k-1}(i)-\mu_f e(n)r(n-i)$, for $i=0$ to $L-1$;

$b_k(i)=b_{k-1}(i)+\mu_b e(n)d(n-i)\alpha((n-i) \text{ MOD } 6)$, for $i=1$ to $M$;

$$\alpha_k(i) = \alpha_{k-1}(i) - \mu_\alpha e(n) \sum_{j \in \Omega_i(n), j \neq 0} b_{k-1}(j)d(n-j), \text{ for } i = 1 \text{ to } 5.$$

In the above expressions, $b(0)=1$ and $\Omega_i(n)$ is defined as the set of integers for a given pair of $(n, i)$ such that $i=(n-j)$ MOD 6, for all $j=0$ to $M$. In other words, $\Omega_i(n)=\{j \in \{0, 1, 2, \ldots, M\}: i=(n-j) \text{ MOD } 6\}$.

If the alternate decision error expression is used, i.e., the error considers the scaling effect, then the adaptive algorithms may be expressed as:

$f_k(i)=f_{k-1}(i)-\mu_f e'(n)r(n-i)$, for $i=0$ to $L-1$;

$b_k(i)=b_{k-1}(i)+\mu_b e'(n)d(n-i)\alpha_{k-1}((n-i) \text{ MOD } 6)$, for $i=1$ to $M$;

$$\alpha_k(i) = \alpha_{k-1}(i) - \mu_\alpha e^1(n) \sum_{j \in \Omega_i(n)} b_{k-1}(j)d(n-j), \text{ for } i = 1 \text{ to } 5.$$

It should be noted that the above two versions are equivalent from a performance standpoint. The only difference lies in the gradients for the adaptation of the scaling parameters: the first algorithm does not include a contribution from $b(0)$ while the alternate algorithm does.

Figure 6:
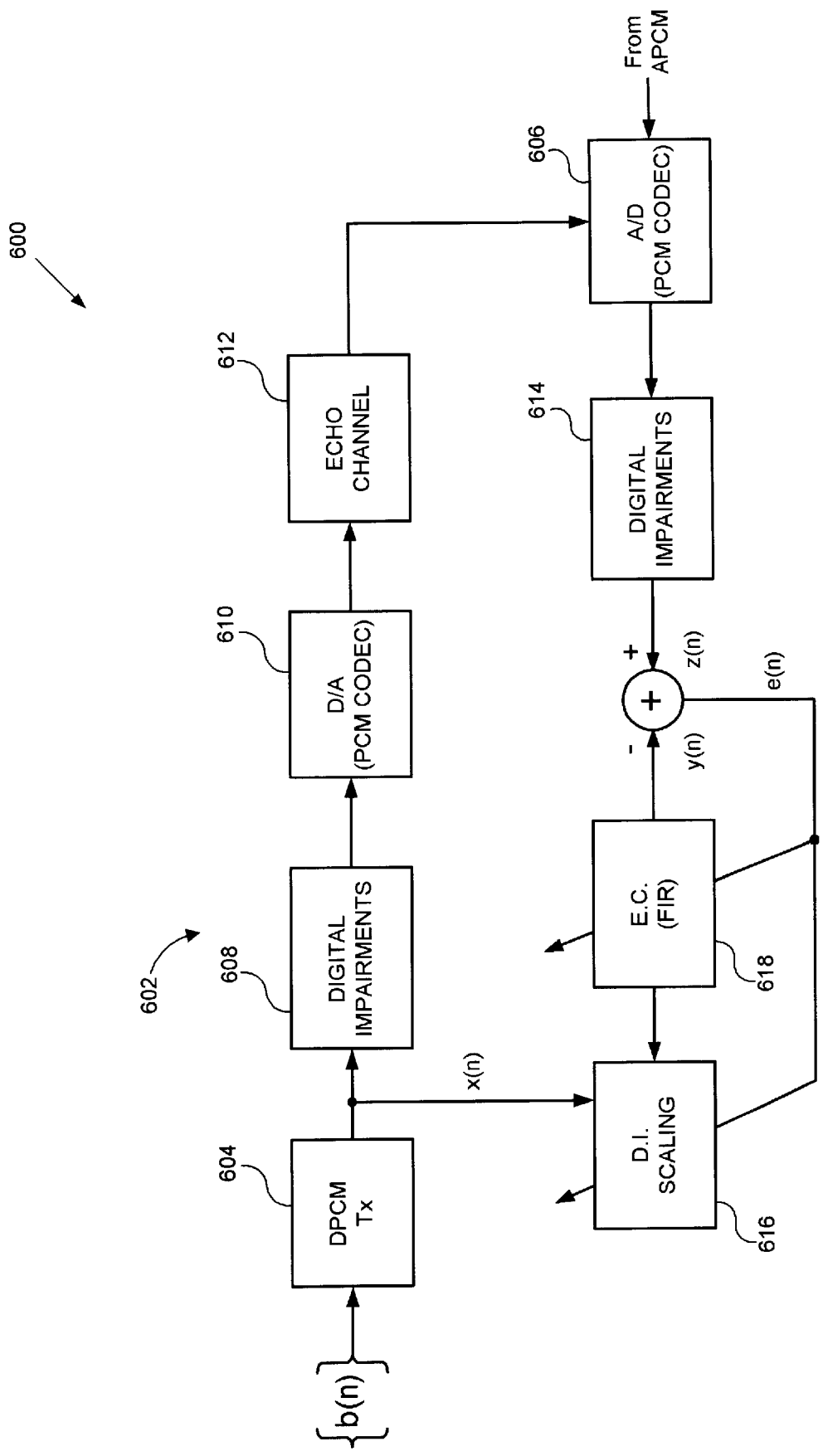
FIG. 6 is a schematic representation of a portion of a DPCM configured to perform the echo canceler training techniques of the present invention.
Figure 7:
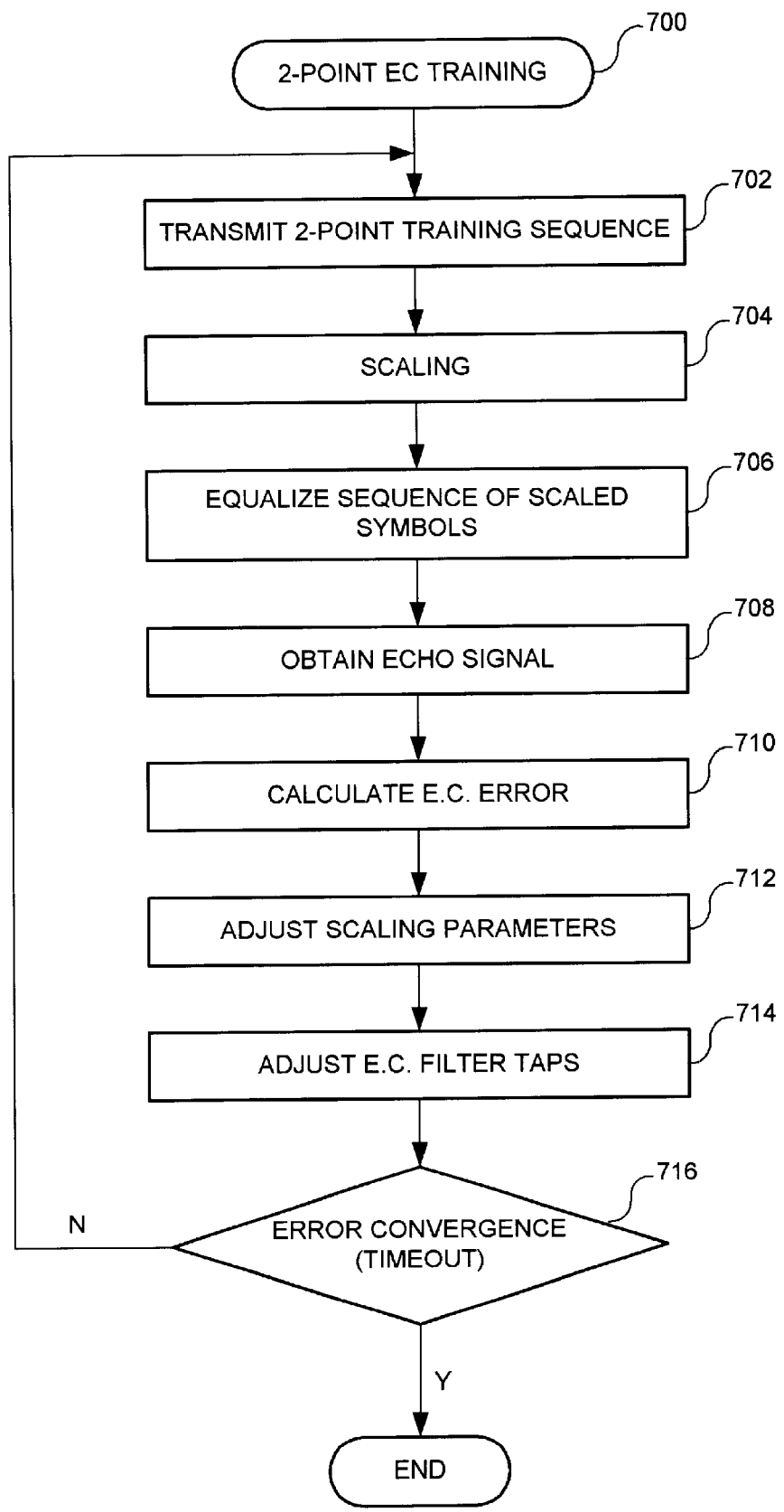
FIG. 7 is a flow diagram of an exemplary two-point echo canceler training process that may be performed by a data communication system implementing the techniques of the present invention.

As described briefly above, the techniques of the present invention may also be utilized to initially train the echo canceler resident at the DPCM. FIG. 6 is a schematic representation of a portion of an exemplary digital data communication system 600. FIG. 6 depicts a portion of the digital communication channel 602, and a number of components located at the DPCM modem. For illustrative purposes, FIG. 7 shows a flow diagram of an exemplary echo canceler training process 700 that may be performed by the DPCM modem.

A DPCM transmitter 604 is configured to transmit a two-point training sequence (as described above) during a task 702 of the echo canceler training process 700. During process 700, the APCM transmitter is preferably disabled such that only an echo signal is processed by a codec 606. The training sequence may be affected by downstream digital impairments 608, e.g., RBS or digital pads, as described above. The impaired digital sequence is eventually converted into an analog signal by a codec 610. An echo channel 612 may be associated with the analog echo response of the data communication system 600. Echo signals may be produced in the network hybrids or other analog components in the transmission channel. The echo signal may subsequently be affected by upstream digital impairments 614 present in the upstream channel. Such upstream digital impairments 614 usually only include RBS and, therefore, can be relatively easy to detect and compensate for.

Referring back to FIG. 7, the two-point training sequence is also utilized by the DPCM to perform echo cancellation training. In the preferred embodiment, the training sequence is fed to a scaling element 616, which may be functionally similar to the scaling elements described above. Scaling element 616 is configured to scale the digital symbols transmitted in the two-point training sequence in accordance with a scaling protocol (task 704). Next, a task 706 may be performed to cause an echo canceler 618 to equalize the sequence of scaled digital symbols. In a practical embodiment, echo canceler 618 may be configured as an adaptive FIR filter structure. Those skilled in the art will appreciate that echo canceler 618 may be considered to be one practical implementation of an adaptive equalizer.

Next, a task 708 may be performed to obtain the echo signal generated in response to the two-point training signal. In FIG. 6, the echo signal (a sequence of digital symbols) is labeled z(n). An echo cancellation error is calculated by subtracting the current output of echo canceler 618 from the current echo symbol (task 710). The error signal, e(n), may be utilized to adaptively adjust the scaling parameters associated with scaling element 616 (task 712) and/or to adaptively adjust the characteristics of echo canceler 618, e.g., by adjusting the filter taps (task 714). As with equalizer training process 300, a query task 716 may be performed to determine whether the echo cancellation error has converged to acceptable values or to test whether a suitable iteration counter or timeout mechanism has been triggered.

If the filter taps of echo canceler 618 are defined to be h(i), for i=0, 1, 2, ..., N−1, then the constructed error signal after echo cancellation can be expressed as follows:

$$e(n) = \sum_{i=0}^{N-1} h(i) x(n-1) \alpha((n-i) \text{ MOD } 6) - z(n).$$

The filter taps of echo canceler 618 and the scaling parameters may be updated according to the following algorithms:

$$h_k(i) = h_{k-1}(i) - \mu_h e(n) x(n-i) \alpha_{k-1}((n-i) \text{ MOD } 6), \text{ for } i=0 \text{ to } N-1;$$

$$\alpha_k(i) = \alpha_{k-1}(i) - \mu_\alpha e(n) \sum_{j \in \Omega_i(n)} h_{k-1}(j) x(n-j), \text{ for } i = 1 \text{ to } 5,$$

where $\Omega_i(n)$ is defined as above and $\alpha(0)=1$ (the fixed reference value), without any loss.

The above adaptive algorithms are based on the common least-mean-square algorithm. Alternate algorithms may be suitably employed to provide equivalent solutions for the scaling parameters. For example, the present invention may use recursive-least-squares algorithms, algorithms based on the Wiener techniques, or the like. These, and other algorithms are described in detail in ADAPTIVE FILTER THEORY by Simon Haykin.

In summary, the present invention provides an improved technique for training an equalizer structure of a digital data communication system in response to a two-point training signal. The equalizer training technique may be used to compensate for the presence of digital impairments such as RBS. The training procedure decouples the compensation of digital impairments from the compensation of analog impairments. In addition, the two-point training procedure may be utilized during the training of an echo canceler structure resident at the DPCM.

The present invention has been described above with reference to a preferred embodiment. However, those skilled in the art will recognize that changes and modifications may be made to the preferred embodiment without departing from the scope of the present invention. For example, the various adaptive algorithm expressions may be implemented in alternate ways depending upon the particular application or in consideration of any number of cost functions associated with the operation of the system. In addition, the techniques described herein may be extended or modified for use with other adaptively trainable components in a digital data communication system. These and other changes or modifications are intended to be included within the scope of the present invention, as expressed in the following claims.

What is claimed is:

1. A method of training an equalizer structure in a data communication system configured to receive an analog signal responsive to a transmitted sequence of a digital codeword having positive and negative signs, said method comprising the steps of:

converting said analog signal into a sequence of digital symbols;

equalizing said sequence of digital symbols with an adaptive equalizer element to obtain a sequence of equalized digital symbols;

scaling said sequence of equalized digital symbols in accordance with a scaling protocol to obtain a sequence of scaled digital symbols; and performing a quantization decision for each of said scaled digital symbols.

2. A method according to claim 1, further comprising the steps of:

calculating a quantization decision error for each of said scaled digital symbols, said calculating step being responsive to said performing step; and adjusting characteristics of said scaling protocol in response to said quantization decision error.

3. A method according to claim 1, further comprising the steps of:

calculating a quantization decision error for each of said scaled digital symbols, said calculating step being responsive to said performing step; and adjusting characteristics of said adaptive equalizer element in response to said quantization decision error.

4. A method according to claim 1, wherein said scaling step multiplies each of said equalized digital symbols with a scaling parameter.

5. A method according to claim 1, wherein:

said transmitted sequence is susceptible to a deterministic, periodic digital impairment associated with a communication channel over which said transmitted sequence is sent;

said digital impairment affects said sequence of digital symbols in a periodic manner based on a period of N symbols; and said scaling step scales said sequence of equalized digital symbols in accordance with at least N scaling parameters.

6. A method according to claim 5, wherein said scaling step scales said sequence of equalized digital symbols in accordance with N scaling parameters, where one of said scaling parameters has a fixed reference value.

7. A method according to claim 5, wherein said digital impairment comprises robbed bit signaling.

8. A method according to claim 5, further comprising the steps of:
- calculating a quantization decision error for each of said scaled digital symbols, said calculating step being responsive to said performing step; and
- adaptively adjusting said scaling parameters in response to said quantization decision error.

9. A method of training an equalizer structure in a data communication system, said method comprising the steps of:
- transmitting a sequence of digital symbols corresponding to a sequence of positive and negative digital codewords having the same level;
- scaling said sequence of digital symbols in accordance with a scaling protocol to obtain a sequence of scaled digital symbols;
- equalizing said sequence of scaled digital symbols with an adaptive equalizer element to obtain a sequence of equalized digital symbols;
- obtaining an echo sequence generated in response to said sequence of digital symbols, said echo sequence being associated with an echo channel of said data communication system; and
- adaptively adjusting characteristics of said scaling protocol in response to an error calculated from said sequence of equalized digital symbols and said echo sequence.

10. A method according to claim 9, wherein said adaptive equalization element is configured to function as an echo canceler.

11. A method according to claim 9, wherein said adjusting step adjusts characteristics of said scaling protocol to reduce said error.

12. A method according to claim 9, wherein said sequence of digital symbols is susceptible to a deterministic, periodic digital impairment associated with a communication channel over which said sequence of digital symbols is sent;
- said digital impairment affects said sequence of digital symbols in a periodic manner based on a period of N symbols; and
- said scaling step scales said sequence of digital symbols in accordance with at least N scaling parameters.

13. A method according to claim 12, wherein said scaling step scales said sequence of digital symbols in accordance with N scaling parameters, one of said scaling parameters having a fixed reference value.

14. A method according to claim 13, further comprising the step of adaptively adjusting said scaling parameters in response to said error.

15. A method according to claim 12, wherein said digital impairment comprises at least one of downstream robbed bit signaling and upstream robbed bit signaling.

16. A method of training an equalizer structure in a data communications system having a communication channel susceptible to a deterministic, periodic digital impairment and analog impairments, said method comprising the steps of:
- transmitting, over said communication channel, a sequence of digital codewords having positive and negative signs, each of said digital codewords representing the same magnitude, and wherein said communication channel comprises an echo channel;
- obtaining an impaired digital sequence generated in response to said sequence of digital codewords, said impaired digital sequence being affected by at least one of said digital and analog impairments;
- compensating for the effect of said digital impairment on said impaired digital sequence, said compensating step being decoupled from a compensation of said analog impairments; and
- adjusting an adaptive equalizer element in response to said compensating step, said adaptive equalizer element being employed to equalize said impaired digital sequence, and wherein said adaptive equalizer element comprises an echo canceler;
- wherein said compensating step comprises the step of scaling said impaired digital sequence in accordance with a scaling protocol to obtain a sequence of scaled digital symbols, said digital impairment comprises robbed bit signaling that affects said impaired digital sequence in a periodic manner based on a period of N symbols, said scaling step scales said impaired digital sequence in accordance with at least N scaling parameters, one of said scaling parameters has a fixed reference value, and said compensating step further comprises the step of adaptively adjusting the remaining ones of said scaling parameters.

17. An apparatus for training an equalizer structure in a digital data communication system configured to transmit signals over a communication channel susceptible to robbed bit signaling (RBS), said apparatus comprising:
- an adaptive equalizer structure configured to equalize a sequence of digital symbols to thereby obtain an equalized sequence of digital symbols;
- an adaptive scaling element configured to scale at least one of said sequence of digital symbols and said equalized sequence of digital symbols to thereby compensate for the effects of RBS, wherein said RBS affects said sequence of digital symbols in a periodic manner based on a period of N symbols and wherein said adaptive scaling element comprises N scaling parameters that are periodically employed to scale said at least one of said sequence of digital symbols and said equalized sequence of digital symbols; and
- an error generating element configured to calculate an error signal in response to said equalized sequence of digital symbols and in response to the operation of said scaling element, wherein one of said N scaling parameters has a fixed reference value and the remaining ones of said N scaling parameters are adaptively adjusted in response to said error signal.

18. An apparatus according to claim 17, wherein said error signal is utilized to update said adaptive equalizer structure.

* * * * *